United States Patent [19]

Johnston et al.

[11] 4,106,007

[45] Aug. 8, 1978

[54] METHOD AND APPARATUS FOR TRANSMITTING INTELLIGENCE OVER A CARRIER WAVE

[75] Inventors: Reed H. Johnston, Wellesley; Dennis C. Jeffreys, Bedford; Lawrence J. Stratton, Lexington, all of Mass.

[73] Assignee: New England Power Service Company, Westborough, Mass.

[21] Appl. No.: 590,941

[22] Filed: Jul. 1, 1975

Related U.S. Application Data

[63] Continuation-in-part of Ser. No. 489,450, Jul. 17, 1974, abandoned.

[51] Int. Cl.² ............................................. H04B 3/54
[52] U.S. Cl. .................................. 340/310 A; 178/67; 340/310 R; 179/2.5 R
[58] Field of Search .............. 340/310 A, 310 R, 163; 325/45, 145, 163; 329/50; 328/133; 332/16 R; 178/67; 179/15 AW, 2.5 R

[56] References Cited

U.S. PATENT DOCUMENTS

| | | | |
|---|---|---|---|
| 3,223,925 | 12/1965 | Florac et al. | 325/163 |
| 3,290,440 | 12/1966 | Easton et al. | 325/45 |
| 3,305,636 | 2/1967 | Webb | 325/47 |
| 3,325,595 | 6/1967 | Dascotte | 178/67 |
| 3,509,537 | 4/1970 | Haberly | 340/310 A |
| 3,626,297 | 12/1971 | Green et al. | 340/310 A |
| 3,641,667 | 2/1972 | Gaines | 329/50 |
| 3,739,277 | 6/1973 | Schneider et al. | 325/45 |
| 3,745,250 | 7/1973 | Gerst | 178/67 |
| 3,746,996 | 7/1973 | Peoples | 329/50 |
| 3,818,344 | 6/1974 | Muilwijk | 325/45 |
| 3,909,750 | 9/1975 | Brady | 325/163 |
| 3,914,695 | 10/1975 | Giusto | 325/145 |
| 3,914,757 | 10/1975 | Finlay et al. | 340/310 A |
| 3,938,129 | 2/1976 | Smither | 340/310 R |
| 3,952,294 | 4/1976 | Emerson et al. | 340/310 R |

Primary Examiner—John W. Caldwell, Sr.
Assistant Examiner—James J. Groody
Attorney, Agent, or Firm—Richard J. Birch

[57] ABSTRACT

A method and apparatus for transmitting intelligence over a carrier wave are disclosed in which a signal wave is combined with a carrier wave to produce a composite wave having a recognizable pattern of variations in intervals that are defined by preselected locations in the composite wave. The pattern of variations in intervals resulting from the combination of the signal wave with the carrier wave represents at least a portion of the intelligence to be transmitted over the composite wave. The intelligence is extracted from the carrier wave for subsequent utilization. In the preferred embodiment the intelligence is transmitted over an electric power distribution network utilizing the alternating wave thereon as the carrier wave. The variations in intervals defined by the preselected locations in the composite wave are detected and the detected interval variations are converted into a signal which has a characteristic that is a function of the recognizable pattern of interval variations.

73 Claims, 9 Drawing Figures

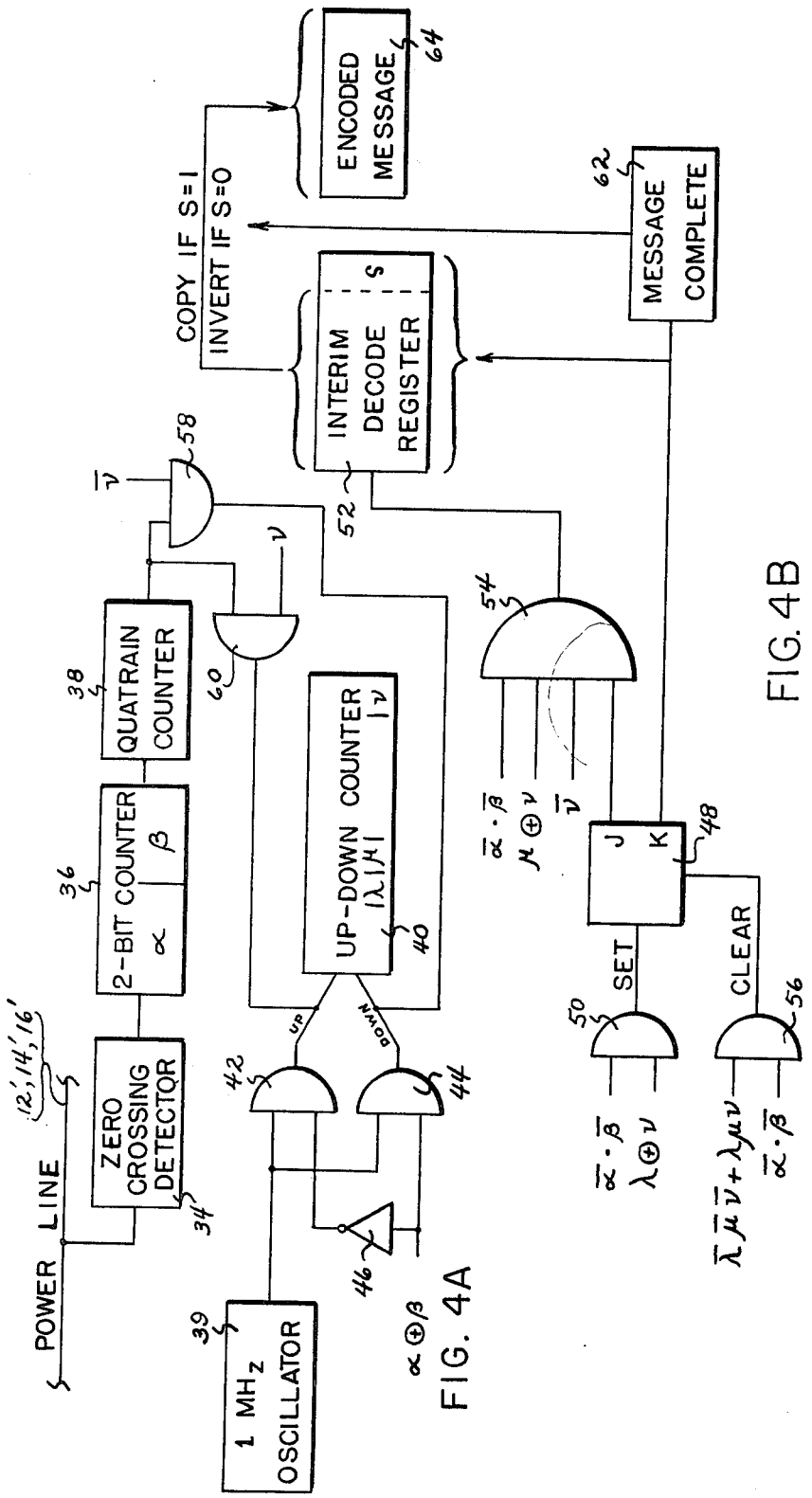

METHOD AND APPARATUS FOR TRANSMITTING INTELLIGENCE OVER A CARRIER WAVE

CROSS REFERENCE TO RELATED APPLICATION

The present application is a continuation-in-part application of application Ser. No. 489,450 filed July 17, 1974, now abandoned, by Reed H. Johnston, Dennis C. Jeffreys and Lawrence J. Stratton for Method and Apparatus for Transmitting Intelligence Over a Carrier Wave.

BACKGROUND OF THE INVENTION

The present invention relates to carrier wave intelligence transmission systems in general and, more particularly, to a method and apparatus for transmitting intelligence over electric power distribution networks.

The use of electric power lines for signalling, meter reading, load control, and other communication purposes is well known in the art. Representative examples of systems which utilize power lines for the communications medium are shown in the following U.S. Letters Pat. Nos: 1,888,555, Nov. 22, 1932 to A. Hund for System of Electrical Distribution; 2,001,450, May 14, 1935 to C. A. Boddie for Transmitting Circuit; 2,263,389, Nov. 18, 1941 to W. Koenig for Remote Control System; 2,457,607, Dec. 28, 1948 to C. E. Seymour for Remote Control System; 2,494,873, Jan. 17, 1950 to W. C. Hall for Remote Control Unit; 2,580,539, Jan. 1, 1952 to C. L. Goodwin for Electrical Remote-Control System; 2,745,991, May 15, 1956 to C. E. Seymour for Centralized Load Control Systems; 2,860,324, Nov. 11, 1958 to F.C.E.M. Berger et al for Power Line Signalling System; 2,942,243, June 21, 1960 to W. Bilz for Automatic Recording Systems; 2,962,702, Nov. 29, 1960 to W. A. Derr et al for Remote Metering; 2,972,686, Feb. 21, 1961 to J. C. G. Pelpel for Remote Control System for Lattice Distribution Network; 3,011,102, Nov. 28, 1961 to I. Balan for Control System; 3,058,095, Oct. 9, 1962 to A. C. Reynolds, Jr. for Binary Code Relay; 3,067,405, Dec. 4, 1962 to H. Hurlimann et al for Method Of Remotely Controlling Electric Switching Arrangements By Means Of Mains-Superposition Central Remote Control Installations And Arrangement For Carrying Out The Method; 3,098,215, July 16, 1963 to D. P. Waite for Data Storage And Transmission System; 3,121,859, Feb. 18, 1964 to W. E. Furniss for Remote Metering System; 3,164,771, Jan. 5, 1965 to R. E. Milford for Apparatus For Central Recording Of Remote Meter Data By Periodic And Sequential Meter Interrogation; 3,229,300; Jan. 11, 1966 to R. J. Thompson et al for Data Gathering And Recording System; 3,234,543, Feb. 8, 1966 to R. J. Thompson et al for Carrier Current Transmitter Unit For Electrically Powered Devices; 3,258,692, June 28, 1966 to O. J. Jacomini et al for Automatic Reading Apparatus For Plural Meters By Transmitted Coded Pulse Trains; 3,264,633, Aug. 2, 1966 to M. W. Hellar For Automatic Power Meter Reading Over Neutral Power Transmission Line; 3,388,388, June 11, 1968 to R. A. Brown for Cumulative Digital Pulse Remote Meter Reading; 3,359,511, Dec. 19, 1967 to R. L. Dennison for System For Remotely Controlling The Operation Of A Power Distribution Network; 3,445,814, May 20, 1969 to A. Spalti for System For Interrogating Remote Stations Via Power Lines Of An Electrical Distribution Network; 3,454,910, July 8, 1969 to A. Nyfeler for Vibratory Switching Mechanism; 3,458,657, July 29, 1969 To R. W. Lester et al for Remote Control Over Power Lines By Transmitting High Frequency Pulses In Phase With Positive And Negative Half Cycles Of The Power Line Current; 3,460,121, Aug. 5, 1969 to W. H. Wattenburg for Signalling And Communication System; 3,462,756, Aug. 19, 1969 to G. A. Mills for Apparatus For Transmitting And Receiving A High Frequency Transient Over A Power Line; 3,482,243, Dec. 2, 1969 to W. H. Buchsbaum for Protective System; 3,483,546, Dec. 9, 1969 to R. A. Ausfeld for Power Line Communication Systems; 3,484,694, Dec. 16, 1969 to A. Brothman et al for Data Transmission System Wherein System Control Is Divided Between A Plurality Of Levels For Remote Location Activation; 3,488,517, Jan. 6, 1970 to J. M. Cowan et al for Control Systems; 3,503,044, Mar. 24, 1970 to P. I. Bonyhard et al for Magnetic Domain Shift Register Meter Reader; 3,508,243, Apr. 21, 1970 to A. Nyfeler et al for Telemetry Arrangements Utilizing Power Distributing Networks For Measuring Consumption; 3,509,537, Apr. 28, 1970 to c. F. Haberly for Digital Communication Apparatus For A Power Distribution Line; 3,540,030, Nov. 10, 1970 to E. M. Hartz for Structure For And Method Of Powerline Load Remote Control; 3,559,177, Jan. 26, 1971 to R. A. Benson for Variable Length, Diverse Format Digital Information Transfer System; 3,594,584, July 20, 1971 to R. E. Woods for Telemetry Circuit For An AC Power System; 3,626,297, Dec. 7, 1971 to S. A. Green for Transfer Trip System Using Quadrature Carrier Modulation With Coherent Detection; 3,626,369, Dec. 7, 1971 to J. D. Ainsworth for Telecommunication Control System; 3,653,024, Mar. 28, 1972 to C. E. G. Lundgren et al for Method Of Selected Diverging Communication And The Combination Thereof With Selected Diverging Communication Between A Group Of Population To A Remote Center, And A System For Carrying Out The Method; 3,654,605, Apr. 4, 1972 to Y. Honda et al for Remote Meter Reading System Having Electro-mechanical Oscillators; 3,656,112, Apr. 11, 1972 to S. Paull for Utility Meter Remote Automatic Reading System; 3,662,366, May 9, 1972 to C. M. D. Neuville et al for Process For The Remote Reading Of Members For Detecting Various Variables, Particulary Of Meters And Similar, And Device For Operating The Same; 3,683,343, Aug. 8, 1972 to S. Feldman et al for Demand Metering System For Electric Energy; 3,702,460, Nov. 7, 1972 to J. B. Blose for Communications System For Electric Power Utility; 3,710,373, Jan. 9, 1973 to S. Watanabe et al for Signal Discriminating System; 3,714,451, Jan. 30, 1973 to J. A. Whitney et al for Phase Selective Telemetry System; 3,719,928, Mar. 6, 1973 to H. Oishi et al for Sweep Signal Meter Reading System; 3,721,830, Mar. 20, 1973 to H. Oishi et al for Pulse Dip Carrier System Using AC Distribution Line; 3,733,586, May 15, 1973 to J. F. Lusk et al for Meter Interrogation System Having Strobe Logic Control.

In any discussion of power line communication techniques, a distinction should be made between electric transmission lines and electric distribution systems. Electric transmission lines exhibit relatively little branching. Accordingly, communication at carrier frequencies in the range 100 to 300 kHz has proved feasible by the simple expediency of providing appropriate filtering and by-pass circuitry at the various junctions. Transmission lines tend to be straight over relatively long distances and in recent years microwave links have tended to replace the earlier carrier schemes.

The electric distribution system differs markedly from transmission lines. Each customer service constitutes a branch in the distribution feeder which follows a circuitous path so as to pass in close proximity to the customer's premises. The branching is so extensive that it is impractical to provide filter and bypass circuitry at each branch point, thus the techniques of carrier communication used on transmission lines are inappropriate for communication in the distribution system. Furthermore, the tortuous path of the distribution feeder precludes the use of microwaves.

There is a growing recognition of the need for communication, preferably digital, over the distribution feeders. In support of this need are the following considerations.

1. At the present time utilities are striving to improve load factors as a means of decreasing peak demand and thereby reducing the need for peak generating units which use hydrocarbon fuels. One approach for improving load factors is the automatic control of loads presented by domestic water heaters. These loads are expected to account for 6.5% of the total electric energy consumption in the United States by 1976.
2. Higher voltage feeders have been introduced to satisfy the demand for increased power. The rise in feeder voltage has produced a concomitant increase in the vulnerability of the feeder to faults. When feeders were supplied at lower voltage, fault isolation equipment was customarily located only at the substation. If the higher voltage feeders are to provide a quality of service comparable to that provided from lower voltage lines, it is important that rapid means be provided for isolation of faulted sections of feeders and for restoration of service to unfaulted sections.
3. There is also a requirement for the controlled switching of the power-factor-correcting capacitors which are used to compensate for the lagging phase angle that results from the customers' inductive loads. The management of utility power systems can be better accomplished by means of controlled switching of capacitor banks in preference to automated switching by means of time clocks, voltage sensors, etc.
4. Automatic meter reading is attracting increased attention. Manual meter reading is highly labor-intensive and accordingly its costs are rising steeply. When access to meters is impossible, billings are made on the basis of estimated readings and such estimaged billings often lead to customer complaints.
5. There is an interest in monitoring conditions and events at sites served by electric power. For example, monitoring functions can include the following:
   A. In oil fields--turning pumps "off" or "on", reading volume flow, checking on operating state of pumps and motors;
   B. Alarm systems--intrusion alarms, low temperature alarms, smoke and fire, etc.

The distribution system is not an attractive medium for conventional communications due to attenuation and dispersion of the signals and because the noise levels tend to be high. To overcome the high noise levels it is generally necessary to use narrow band filtering, error-detecting and error-correcting codes, and relatively high signalling power level at low bit rates.

Recent investigations relating to communication in the distribution system include the following:

1. Automated Technology Corporation has used three level frequency shift keying in the frequency range which passes through distribution transformers by virtue of the interwinding capacitance. However, these signals are very severely attenuated on passing through distribution transformers and on passing through power-factor-correcting capacitors.
2. General Public Utilities has employed two level frequency shift keying with frequencies in the range 900 Hz to 1100 Hz (See U.S. Pat. No. 3,733,586). These signals pass through distribution transformers by inductive coupling. However, power-factor-correcting capacitors introduce troublesome attenuation and signal attenuation is markedly greater during periods of peak demand than during off-peak periods.
3. A broad range of frequencies is being examined by a number of workers at the present time with particular attention centered on the frequencies in the range of 100 to 300 kHz and in the upper audio spectrum.
4. Various European companies currently offer "ripple control" systems in which frequencies ranging from 140 Hz to 750 Hz are superimposed on the transmitted power. Different frequencies are used to prevent cross-talk between interconnected utility systems. Each coded transmission lasts for about 30 seconds.

The above signalling approaches generally suffer from one or more deficiencies. For example, the power levels used in the "ripple control" approach and in other signalling techniques, are high and costs of such signal generation and signal detection are considered by many to be excessive. The use of narrow band transmission requires that the transmitter and detector employ the same technique for establishing the frequency window. Although this can be accomplished either through phase-locked loops which are governed by line frequency or by crystal control, such techniques introduce additional circuit complexity and cost.

It is accordingly a general object of the invention to provide an improved method and apparatus for transmitting intelligence over a carrier wave so as to prepare undisturbed the usual useful characteristics of the carrier wave while producing recognizable changes in its characteristics which will permit its use for transmission of additional data;

It is a specific object of the invention to provide an improved method and apparatus for transmitting intelligence over electric power lines;

It is another object of the invention to provide a method for transmitting intelligence over electric power lines utilizing existing hardware components.

It is a feature of the invention that power-factor correcting capacitors and transformers introduce no appreciable signal attenuation.

It is another feature of the invention that the method thereof can be practiced with relatively inexpensive hardware without impairing the reliability of the communications system.

These objects and features and other objects and features will best be understood from a detailed description of a preferred embodiment thereof, selected for purposes of illustration and shown in the accompanying drawings, in which:

FIGS. 4A and 4B are a combined a block diagram of an embodiment of the signal receiver shown in FIG. 3;

Figure 1:
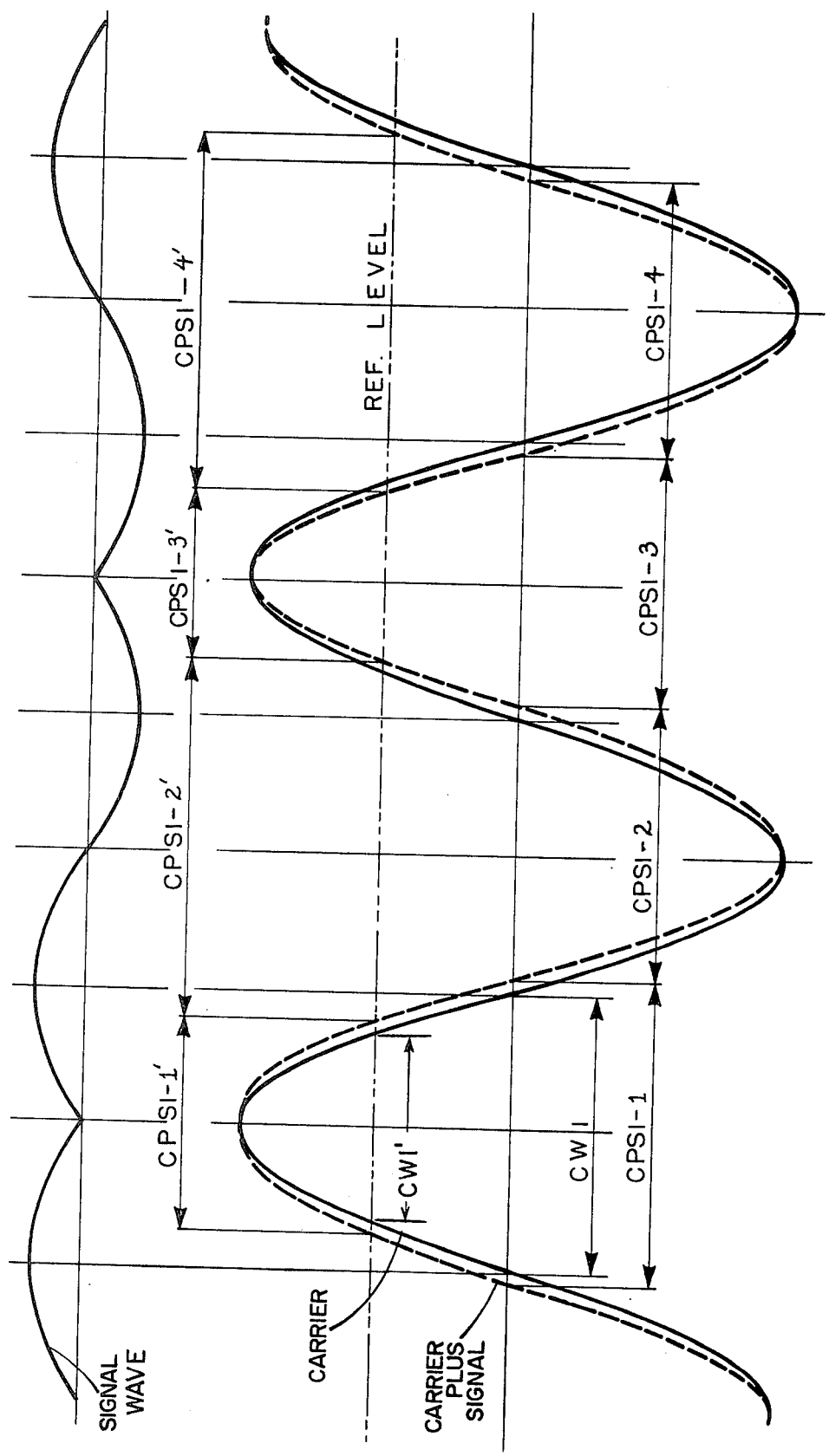
FIG. 1 is a waveform diagram illustrating a carrier wave, a signal wave and a composite wave produced by combining the signal wave with the carrier wave.
Figure 3:
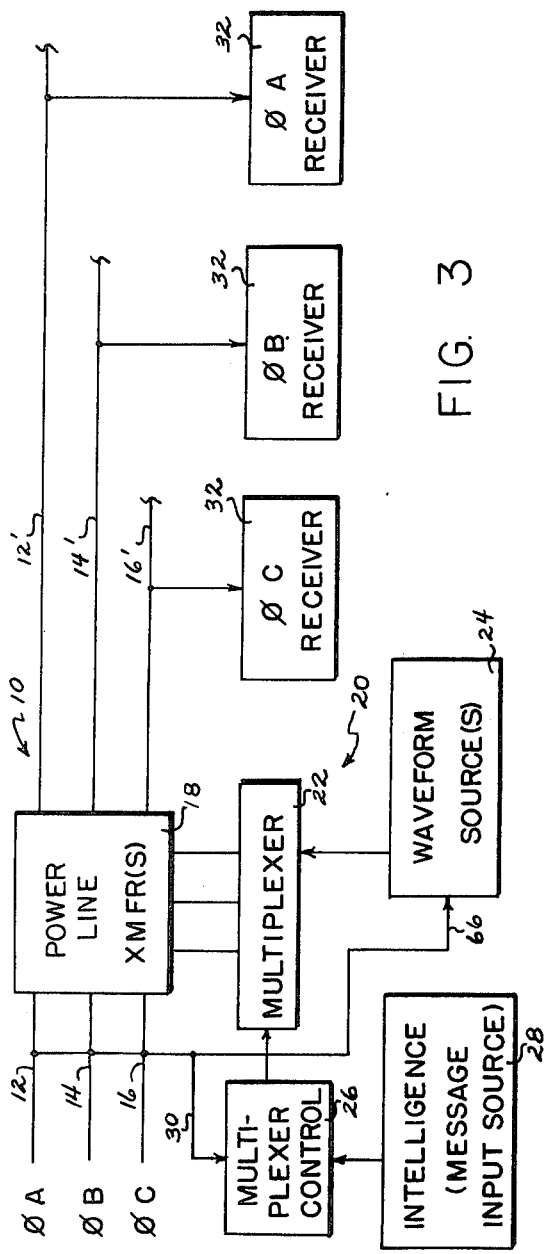
FIG. 3 is a block diagram showing a portion of an electric power system with the transmitting and receiving equipment associated therewith for transmitting intelligence over an alternating voltage power line utilizing the method of the present invention.

Turning now to the drawings, the intelligence transmission method and associated apparatus of the present invention can best be understood by referring to FIGS. 1 and 3 of the drawings in connection with the following discussion. In its broadest application, the method provides for the transmission of of intelligence over a carrier wave in any medium. However, for purposes of illustration only, the method will be described herein in connection with the transmission of intelligence over electrical power lines having alternating voltage thereon. The term "power line", as used herein, shall mean any circuit capable of transferring energy by means of alternating current. Thus "power lines" can include conventional electric transmission lines, electric distribution networks, shipboard and aircraft wiring systems, train and other vehicle power circuits, both internal and external to the vehicle.

GENERAL MODULATION AND DETECTION CONCEPTS OF THE INTELLIGENCE TRANSMISSION METHOD

The ground based electric distribution system is designed for the efficient transmission of 50 or 60 Hz signals while vehicle power circuits may employ higher or lower frequencies. For purposes of discussion, the term 60 Hz will be used in the following description of the invention.

The approach disclosed herein for communicating data over the electric power grid is to impress upon the 60 Hz wave a signal wave which travels preferentially and with minimal dispersion and attenuation to the desired destinations. The transmission of intelligence in the direction of energy flow is referred to herein as "outbound" signalling.

The modulating signal wave for outbound signalling is combined with the 60 Hz voltage and/or current wave in order to effect a recognizable distortion of that wave. The distortion displaces the zero-crossings (or other preselected locations) of the 60 Hz wave so that the intervals defined by successive zero-crossings (or other preselected locations) depart in a readily recognized pattern from the pattern that is characteristic of the unmodulated voltage wave. The modulated or "composite" wave can be obtained by combining a "signal" wave with the pre-existing, unmodulated 60 Hz wave (the "carrier" wave). The term "combining" means the operation in which the carrier wave is modified by the addition or subtraction of, or multiplication by, the modulating signal wave.

When the modulating signal wave is added to the unmodulated 60 Hz carrier wave, the 60 Hz wave is not a "carrier" in the conventional multiplicative sense. A similar distinction can be made in the detection process for additive modulation in that the modulating wave itself need not be recovered. It is sufficient just to extract from the pattern of variations the transmitted intelligence.

An important aspect of the preferred embodiment applicable to power lines is that a modulating signal wave of relatively modest power level can produce readily recognizable changes in the power line wave by concentrating the influence in the vicinity of the zero-crossings of the power line wave at which location the instantaneous power in the distribution system is low. This can be accomplished in such a manner as not to affect the normal useful characteristics of the unmodulated 60 Hz power line wave. The preference for a modulating signal wave comprising sinusoidal segments stems from the fact that these segments are readily available from the power line system itself and that the resulting composite wave can preserve the smooth, continuous, contour characteristic of the unmodulated 60 Hz power line wave.

At least a portion of the intelligence to be transmitted is represented by the pattern of variations in intervals that are defined by preselected locations in the composite wave. In the broadest sense, the intelligence can be represented by the minimum recognizable pattern of variations in the composite waveform. Expressed in digital terminology, a "bit" can be represented by a minimum recognizable pattern of variations in intervals in the composite wave. A "one" or "zero" can be represented by the presence or absence of the recognizable pattern of variations in intervals in the composite wave or by two different patterns. This minimum recognizable pattern is produced by combining a signal wave with the unmodulated 60 Hz alternating wave. This modulating signal wave usually can be represented as a Fourier series within the intervals established by the resulting minimum recognizable pattern in the composite wave.

In this usual case if the composite wave is viewed as the combination of a signal wave with an unmodulated 60 Hz wave then the modulating signal wave can be represented as a Fourier series with a fundamental frequency which is either 60 Hz or some rational fraction (not necessarily proper) of 60 Hz; and, if the fundamental frequency is 60 Hz the Fourier series consists of more than a single term. Additionally, the modulating signal wave has a phase relative to the unmodulated 60 Hz signal such that the various zero-crossings of the composite wave will be displaced to differing extents.

The extraction of the intelligence represented by the pattern of variations in the composite wave can be accomplished by a variety of techniques. For example, the durations of the intervals defined by successive zero-crossings of, or other preselected locations in, the composite wave can be detected and compared in accordance with a detection algorithm appropriate to the modulation pattern as represented by the variations.

REJECTION OF ARTIFACTS ATTRIBUTABLE TO HAlf WAVE RECTIFICATION

It is desirable in an "outbound" signalling system to be able to communicate digital information to the premises of consumers. It is possible that the load imposed by a consumer might consist of half wave rectification. The voltage drop in the entrance leads resulting from the component of direct current might in such cases produce an off-set in the alternating voltage such that the intervals between successive zero-crossings would cease to be equal. If this situation occurred, the artifact would be indistinguishable from the modulation pattern produced by superimposing on the unmodulated 60 Hz wave a suitable modulating signal wave which is expressible as a Fourier series with a 60 Hz fundamental frequency. Clearly, it is desirable to avoid this possible ambiguity.

Accordingly, the preferred modulating signal waves are expressible in the form of a Fourier series in which the fundamental frequency is a rotational, noninteger fraction (not necessarily proper) of the unmodulated 60 Hz wave. When this fraction is expressed in its lowest terms the denominator will then designate the period of the modulated wave in 60 Hz periods. In order that the detection algorithm may be reasonably simple it is in general desirable that the duration of the modulated wave representing each "bit" be not excessively long.

MODULATION - WAVEFORMS

Many different waveforms, either repetitive or non-repetitive, can be employed as the modulating signal wave but certain waveforms are preferable as a means of effecting a desirable modulation. The criterion of "desirable" implies an examination of the trade-off between modulator simplicity and detector simplicity. It also implies consideration of the optimum phasing of the modulating signal wave relative to the phase of the carrier wave and the desirability that the peak amplitude of the composite wave will be the same as the peak amplitude of the unmodulated 60 Hz carrier wave. The frequency spectrum of the modulating signal wave should be determined and the effect of the attenuation of higher frequencies considered in selecting a suitable waveform.

One preferred modulating "signal" wave is shown in FIG. 1. This wave can be described as comprising successive "full" sinusoidal cycles of a 60 Hz wave with a phase reversal of a full cycle occurring in alternate full cycles. The terms "full" and "half" sinusoidal cycles refer to the theoretical "full" and "half" cycles and include, as used herein, any such approximations as may result from switching transients associated with the practical implementation means. For purposes of illustration, the ratio of the signal amplitude relative to that of the carrier (power line voltage) has been chosen to be large to accentuate the time difference between the zero-crossings (or preselected locations).

A Fourier analysis of this wave reveals that the wave that is bounded by $\pm 1$ in amplitude has the expansion $$\Sigma\, a_k \cos kwt \quad k = 1, 3, 5 \text{ etc.}$$

when $$a_k = -8/\pi\, (k^2 - 4)^{-1}$$

and $w$ is the angular frequency of a 30 Hz wave. The various frequencies comprising this waveform are thus 30, 90, 150, 210, 270, 330, etc. Hz.

OPTIMUM PHASING OF THE PREFERRED WAVEFORMS OF FIGS. 1 AND 2

Figure 2A:
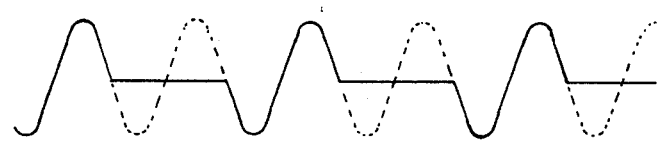
FIG. 2A is a waveform diagram showing an alternative waveform for the signal wave.
Figure 2B:
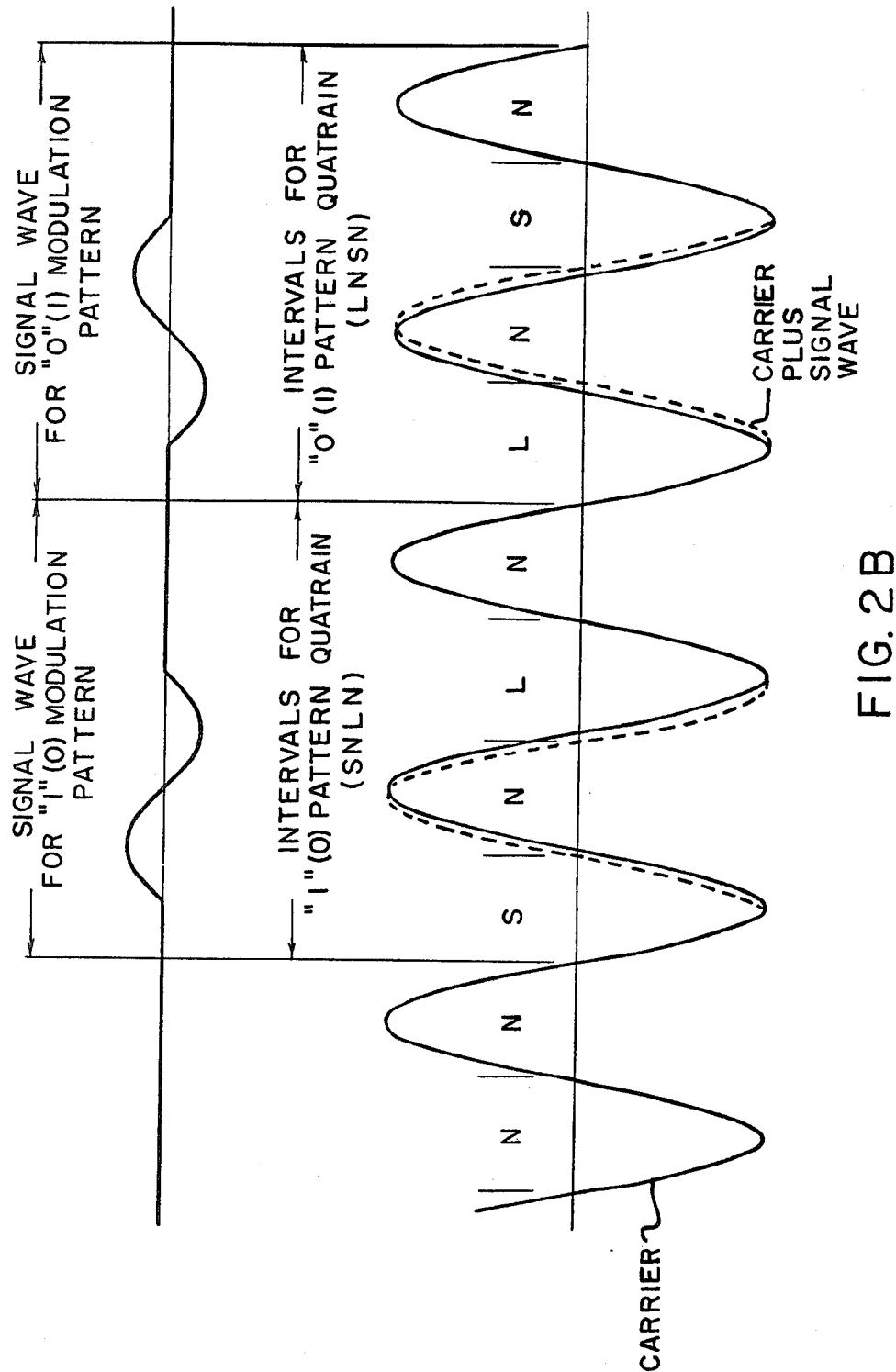
FIG. 2B is a waveform diagram showing another alternative waveform for the signal wave.

The optimum phasing of the preferred modulating signal waves shown in FIGS. 1, 2A and 2B is such that the zero-crossings of one of the 60 Hz voltage carrier waves should occur at the extrema of the modulating signal wave. When the preferred modulating signal waves are applied in this preferred phase relationship, the peak amplitude of said one voltage wave is the same as the peak amplitude of the composite voltage wave in that phase.

It is important in an electric power distribution network to avoid modulation of the amplitude of the composite wave (carrier plus signal wave) and to insure that the peak amplitudes of the composite wave depart minimally from the peak amplitudes of the power line voltage wave. Such desiderata can in general be satisified only if the modulating signal wave has zero-levels at the extrema of the carrier wave.* The term "zero" as used herein refers to the theoretical "zero" as well as to the approximate "zero" achievable in a practical embodiment.

In order to achieve maximum interval distortion of the composite wave in most circumstances, the modulating signal wave has its extrema at the zero-crossings of the carrier wave.

Given the preferred phasing with respect to one phase of a three phase system, the zero-crossings of the other two 60 Hz voltage carrier waves in the three phase system will occur where the absolute value of the amplitude of the modulating signal wave is one half of the maximum value. If the signal wave of FIGS. 1, 2A or 2B is superimposed upon at least one of the three 60 Hz voltage carrier waves in this phasing, then the durations of the intervals defined by successive zero-crossings of the composite wave (or waves) will no longer be equal but will be altered in accordance with the following pattern:

$$\sum_r \begin{bmatrix} \text{increased} & & \text{decreased} & \\ & , \text{unchanged,} & & , \text{unchanged} \\ \text{(decreased)} & & \text{(increased)} & \end{bmatrix}_r$$

where $r$ is equal to or greater than 1. These intervals are identified in FIG. 1 as CPSI-1 (Carrier Plus Signal Interval), CPSI-2, CPSI-3, and CPSI-4, respectively. The "unchanged" intervals CPSI-2 and CPSI-4 have the same duration as the corresponding carrier wave interval ("CWI") defined by successive zero-crossings of the carrier wave.

Although the intervals CPSI-1 through CPSI-4 are defined in FIG. 1 by successive zero-crossings of the carrier wave, it should be understood that the intervals can be defined by other preselected locations in the composite wave. The preselected locations can, of course, be expressed in terms of waveform-amplitude or time relationships e.g. at 175° and 355°. Preferably these preselected locations are selected with respect to the zero-crossings of the composite wave. This can be the zero-crossing itself (current or voltage) or in a more practical implementation at an amplitude which differs from the actual zero-crossing by voltages corresponding to the forward voltage drop in a silicon diode. For instance, an arbitrary reference level (or levels, either positive and/or negative) can be established, as shown by the "reference level" line in FIG. 1, to define the intervals, CPSI-1', CPSI-2', CPSI-3', and CPSI-4'. These intervals have the same interval duration pattern as the interval duration pattern of the unprimed intervals CPSI-1 through CPSI-4 if referenced to CW1' and a different pattern if referenced to CW1. However, the interval pattern CPSI-1' through CPSI-4' is recognizable and can be detected and processed using a corresponding detection algorithm.

Conceptually, it will be appreciated that the minimum recognizable pattern of variations in intervals in the composite wave is two intervals the durations of which are compared.* In this case it will be understood that there is only one recognizable variation since only two intervals are compared. For purposes of this application this single recognizable interval variation is included within the plural phase "recognizable pattern of variations in intervals." The comparison of interval durations can be made with respect to a variety of intervals. For example, "Increased" (Long) or "Decreased" (Short) can be compared with respect to the unmodulated wave normal interval i.e., the "Unchanged" interval in the composite wave or with each other or with the mean of the composite wave or with an interval defined by an external clock. Thus, in binary notation, a "one" can be represented by an "Increased" interval and a "zero" by a "Decreased" interval or vice versa. Various combinations of "Increased", (Long) "Decreased" (Short) and "Unchanged" (Normal) interval patterns also can be established to represent intelligence including the binary "one" and "zero". For example, a binary "one" can be represented by a Long, Normal, Short, Normal (LNSN) interval pattern and a "zero" by the complementary pattern Short, Normal, Long, Normal (SNLN).

The detection of the variations in intervals defined by the preselected locations in the composite wave is accomplished by means of conventional circuitry. Level detectors generally and zero-crossing detectors specifically, are well known in the art and therefore need not be described in any detail. A general discussion of the detection-conversion circuitry will be presented below in connection with the specific description of the signal "receivers" shown in FIGS. 4A, 4B and 5.

Given the phasing of the modulating signal and carrier waves as shown in FIG. 1, it will be appreciated that the modulation will be twice as great in the case of the 60 Hz voltage carrier wave which has its zero-crossings at the extrema of the modulating signal wave than in the case of the other two voltage carrier waves in a three phase system. Furthermore, any departure from this optimum phasing will result in a reduction of the modulation for one of the phases of 60 Hz voltage waves.

CONTRIBUTION OF HIGH FREQUENCY COMPONENTS

It has been mentioned previously that the frequencies comprising the preferred modulating signal waveform shown in FIG. 1 are 30, 90, 150, 210, 270, 330 etc. Hz. The modulating signal waveform of FIG. 2A differs from that shown in FIG. 1, in its harmonic content, only in the fact that a 60 Hz component also appears in the FIG. 2A waveform. This can be readily seen from the fact that the FIG. 2A waveform can be derived from FIG. 1 waveform by addition thereto of a 60 Hz wave of amplitude and phase identical with one of the sinusoidal segments of the FIG. 1 waveform. Since it is known that the higher frequency components are severely attenuated on passing power-factor-correcting capacitors, it is appropriate to consider the consequences of such attenuation.

Using a Fourier expansion of the modulating signal waveform shown in FIG. 1 it can be demonstrated that the predominant role of the higher frequencies is one of improving the approximation in the regions where the two sinusoidal waves join with phase reversal. From the point of view of modulating the interval between zero-crossings of the 60Hz voltage wave it is important that the actual modulating signal waveform closely approximate the theoretical waveform in the vicinity of the zero crossings of the three phase reference (carrier) voltage waveforms. From the Fourier expansion it is clear that frequencies higher than 150 Hz exert negligible influence on the amplitude of the modulating signal waveform at these points.

POWER LINE SYSTEM BLOCK DIAGRAM

FIG. 3 illustrates in block diagram form a portion of an electric power system in which intelligence is transmitted over the system's power lines utilizing the alternating voltage/current thereon as the carrier wave. It has already been mentioned that in practicing the method of the present invention, a signal wave is combined with the carrier wave to produce a composite wave having a recognizable pattern of variations in intervals defined by preselected locations in the composite wave. The pattern of variations in the intervals which results from the combination of the signal wave with the carrier wave represents the intelligence to be transmitted. The intelligence is extracted at a remote location preferably by detecting the variations in intervals and then converting the detected variations in intervals into a signal having a characteristic which is a function of the pattern of interval variations.

Looking at FIG. 3, there is shown a portion of a 3 phase electric power system indicated generally by the reference numeral 10. The power system 10 includes three phase A, B, and C input power lines 12, 14 and 16, respectively, and a power line transformer(s) 18. The corresponding three phase output lines from transformer(s) 18 are identified by the same reference numerals as were used for the input lines, but with the addition of a prime notation. Transformer(s) 18 can be either a step-up or step-down transformer depending upon the desired power system voltage transformation.

The signal wave which represents the intelligence to be transmitted over the power line can be combined with the alternating carrier waves on the power lines 12, 14 and 16 by means of a variety of modulation techniques known to those skilled in the art. For purposes of illustration only, a multiplexing system indicated generally by the reference numeral 20, is depicted in FIG. 3. The multiplexing system 20 comprises a multiplexer 22, a modulating signal wave source or sources 24 for generating the signal wave to be multiplexed, a multiplexer control 26 and an input message source 28.

A phase reference is provided to the multiplexer control 26 from one of the phases of the power lines e.g. from phase A on input line 30. The specific phasing of the modulating signal waveform from source 24, to be multiplexed, is employed in the transmission system to generate two recognizably different patterns of variations in the intervals between successive preselected locations (e.g. zero-crossings) in the composite wave. A representative example of a waveform pattern generator will be discussed below in greater detail. However, for the moment, it is sufficient to note that the two recognizably different patterns of variations in the intervals represent binary information and are employed to transmit the intelligence in digital form. These two different patterns are illustrated in FIG. 2B and will be discussed below.

These variations in intervals in the composite wave are detected by one or more receivers 32. If the same intelligence signal wave is added to one of or to all three phases of the power system, only one receiver is required at the composite wave reception location served by all three phases. However it should be understood that the method of the invention can be used to transmit in a polyphase system. In the latter case, a separate receiver is employed for each signal, as shown in FIG. 3. In the case of these polyphase signals, different messages can be sent over different phases. Furthermore, a single signal wave from source 24 may be multiplexed to serve two or more phases.

Figure 5:
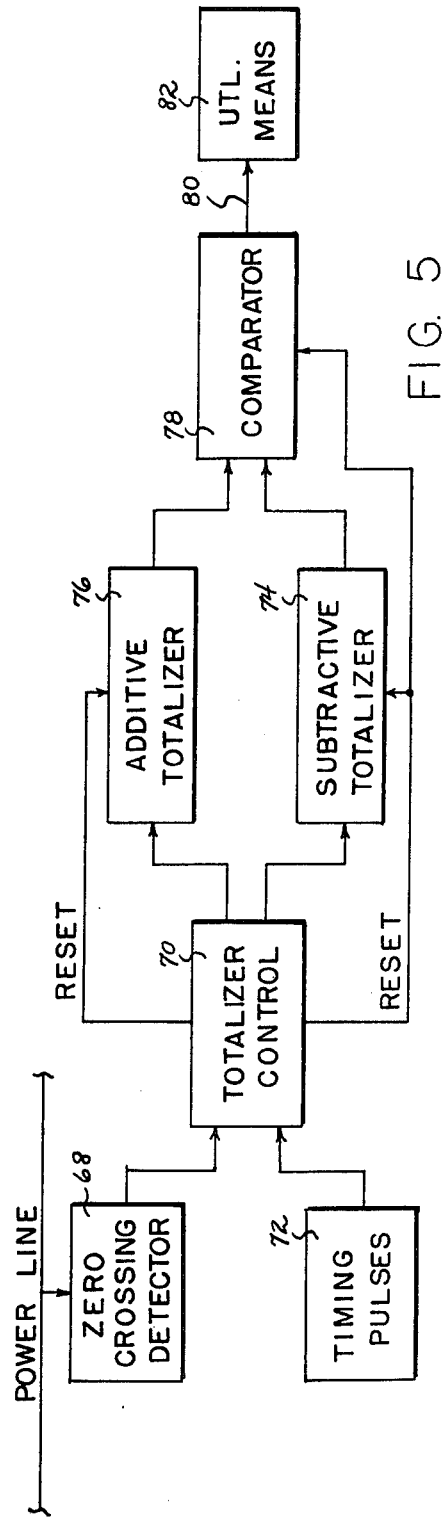
FIG. 5 is a block diagram of another embodiment of the signal receiver shown in FIG. 3; and, FIGS. 6A and 6B are diagrams in schematic form of one means for combining the signal wave with the carrier wave at a Y-connected transformer.

The specific circuitry for the receiver 32 can be implemented in a number of configurations. From a functional standpoint, the receiver detects the variations in the intervals of the composite wave and converts the detected interval variations into a signal, preferably electrical, that has a characteristic which is a function of the pattern of interval variations. This signal can then be employed in conjunction with any appropriate utilization means (e.g. a load controller for domestic hot water heaters). Two different embodiments of a suitable receiver are depicted in FIGS. 4A, 4B and 5. Each receiver will be described separately after a description of the message format convention.

MESSAGE FORMAT - ZERO AND ONE CONVENTION AND BIT CONFIGURATION

One suitable detection algorithm for the FIGS. 1, 2A and 2B signal waves is $$\sum_n (\text{add, subtract, subtract, add})_n \text{ where } n > 1$$

of the composite waveform intervals which detection algorithm may conveniently be termed a "quatrain". This algorithm can be used in controlling the counting into an up-down counter of timing pulses during each defined interval in the composite wave. The pattern of distortion of the intervals defined by the successive zero crossings of the composite wave resulting from the addition of the FIGS. 1 or 2A signal waves to the carrier wave is (increased, unchanged, decreased, unchanged) This pattern can be repeated a number of times to improve the signal-to-noise ratio and with a concomitant repetition of the detection algorithm subtraction and addition process.

Since each quatrain comprises four half cycles and each modulation pattern comprises four half cycles, there is no means of insuring that at the detection site the quatrain will start on the approximate half cycle of the modulation pattern. Whether the contents of the up-down counter, at the end of a quatrain or of successive quatrains will be found to increase or to decrease, will depend upon what portion of the modulation pattern corresponds to the initial interval of the detection quatrain. If the first period of the detection quatrain coincides with one of the first two periods of the modulation pattern, the contents of the up-down counter at the end of a quatrain or of successive quatrains will be found to increase; if the initial period of the quatrain coincides with the third or fourth period of the modulation pattern, the contents of the up-down counter will be found to decrease.

The transmission of a bit can involve the use of a modulation pattern which will cause the count at the end of a quatrain or of successive quatrains in the up-down counter to change monotonically in one sense for a "one" and in the opposite sense for "zero". When such a modulation pattern is used, a period of no modulation separates successive bits and the up-down counter is reset once this period of no modulation is sensed. Clearly the signal-to-noise ratio can be improved by employing longer modulation patterns i.e., a series of successive or redundant patterns (at the same signal amplitude) provided the noise is of random phase.

If the noise is phase coherent, it is possible to achieve improved signal-to-noise ratio by adopting a modulation convention in which the transmission of a bit involves a modulation pattern, during a rising phase in which, the count in the up-down counter at the end of successive quatrains changes monotonically. Then this rising phase is followed by a falling phase of equal duration in which this count changes monotonically in the reverse sense. If the noise were of random phase and the count initially in the up-down counter were zero, then the contents at the end of successive quatrains would accumulate in absolute value until the end of the rising phase and subsequently would decline to near zero (actually zero if there were no noise) by the end of the falling phase. Given this situation, a "one" is represented by a modulation pattern that causes the count at the end of successive quatrains to increase in one sense and subsequently to decline, while a "zero" is represented by a modulation pattern that causes this count to increase in the opposite sense and subsequently to decline.

The sense in which the count accumulates will of course depend upon the particular period in the modulation pattern which is chosen as the initial period of the detection quatrain. The ambiguity which this introduces can be overcome by adopting the convention that each transmission of digital information will begin with the transmission of a "one" which is extraneous to the message. This permits each receiver to establish its own convention relative to ones and zeros.

RECEIVER - FIG. 4

FIGS. 4A and 4B in combination illustrate in block diagram form one embodiment of the receiver 32 which is suited for discrimination against noise of non-random phase. A zero crossing detector 34 is used to detect the successive zero crossings of the composite wave which appears on the 60 Hz power line. The number of detected zero crossings is counted in a two-bit counter 36 designated $\alpha,\beta$ and the output of this counter is counted in a quatrain counter 38. The status $\alpha,\beta$ of counter 36 identifies the particular interval of the detection quatrain. A 1 MHZ oscillator 39 is used to measure the duration of each of the four periods in the quatrain. Successive microseconds are counted into an up-down counter 40 and the "up" or "down" sense is determined by means of AND gates 42 and 44, respectively. The control of the gates is effected by means of an input consisting of the "exclusive or" of $\alpha$ and $\beta$ to AND gate 44 and by the inverse of this signal produced by inverter 46 to control gate 42.

The up-down counter 40 should be large enough to accommodate a count corresponding to somewhat more than half a period of 60 Hz signal. The number in the up-down counter 40 by the end of a detection quatrain as identified by the logic state $\overline{\alpha},\overline{\beta}$ may be positive or negative. If positive, the most significant bit designated by $\nu$ will be zero and if negative, this bit will be one.

Assuming that the count starts from an initial state in which the contents of the up-down counter 40 is zero, the count at the end of successive quatrains will increase monotonically in absolute value during the first half of each bit. As a result, after an appropriate number of quatrains have been detected, the bit designated by $\lambda$ in the up-down counter will be opposite to the bit designated by $\nu$. When this condition prevails at the end of a detection quatrain, a flip-flip 48 is set to a state J = 1 by means of AND gate 50. The setting of flip-flop 48 to a state J = 1 identified the fact that the first half of the bit is being counted into the up-down counter. As counting proceeds, the count accumulated in the up-down counter at the end of successive detection quatrains will increase in absolute value so that the next bit designated $\mu$ will attain a state which is opposite to that designated by $\nu$. When this condition prevails, a one or a zero is loaded into an interim decode register 52 according to whether the bit designated as $\nu$ is zero (for a positive count in the up-down register) or is one (for a negative count in the up-down register). The loading of the appropriate bit into the interim decode register is accomplished through AND gate 54.

The counting into the up-down counter will proceed and the contents will increase in absolute value at the end of successive detection quatrains until the mid-point of the bit is reached. At this point the phase of the modulating signal is reversed and the count in the up-down counter achieved at the end of successive detection quatrains then diminishes in absolute value. During the second half of the bit, a condition will be obtained such that at the end of a detection quatrain the absolute value of the count in the up-down counter will be such as would correspond to a state designated $\lambda.\nu.\mu.$ or $\overline{\lambda}.\overline{\nu}.\overline{\mu}$. On attaining this state, the detection of the transmitted bit will have been correctly recorded in the interim decode register 52 and the contents of that register are shifted by one bit in preparation for the decoding of the succeeding bit. This is achieved through the control effected by "AND" gate 56 which resets the J-K flip-flop 48.

In order to discriminate against non-random noise, provision is made for the subtraction at regular intervals, at the end of a quatrain, of one unit from the absolute value of the contents in the up-down counter 40. In the logic depicted in FIGS. 4A and 4B this is achieved on overflow from the quatrain counter 38 through AND gates 58 and 60 which feed respectively to the "down" and the "up" inputs of the up-down counter. It will be appreciated that more than "one" unit can be subtracted at the end of a quatrain. The appropriate amount to subtract is determined by the bias count residing in the up-down counter at the conclusion of the falling phase.

The number of shifts to the interim decode register 52 is counted in a counter 62 which is used to determine when the message is complete. When the count in counter 62 attains the level which indicates that a complete message has been received, the correct message appears in register 64 which is designed to hold the encoded message. Register 64 is loaded from the Interim Decode Register 52 by copying all except the most significant bits if the most significant bit (designated as S) is a "one" and if S is a "zero" then this portion of the contents of the interim decode register is inverted before it is copied into register 64.

The accumulation of the detected signal in the FIGS. 4A and 4B receiver embodiment can be illustrated by the following example. Assuming that the modulating signal waveform is applied between the common point of a Y-connected secondary and ground and that its amplitude is one percent of the phase-to-phase voltage, then it is 1.73 percent of the phase to neutral voltage. In the case of the 60 Hz phase which has zero-crossings at the extrema of the preferred modulating signal waveform of FIG. 1, the displacements of the zero-crossings will amount to $$\pm \sin^{-1} 0.0173 = 0.99° \text{ ie } 1°$$

If the intervals between successive zero-crossings of the composite wave in the phase which is most affected by the modulation are measured by counting cycles of a 1 MHz oscillator between these zero-crossings and the detected signal is accumulated by counting into an up-down counter in accordance with the detection algorithm (up, down, down, up)

then the count in the up-down counter will accumulate at a rate of $$10^6 \times (4/720) = 5560 \text{ counts per second}$$

In the case of the other two phases these counts will accumulate at 2780 counts per second. In the case of the signal wave of FIG. 2A having the same peak amplitude, the accumulated count will be only half as great.

RECEIVER - FIG. 5

Another embodiment of the receiver 32 is depicted, in FIG. 5. In the form depicted noise is assumed to be of random phase (this is consistent with preliminary measurements made on actual power line systems). The receiver embodiment shown in FIG. 5 totally eliminates the need for up-down counters without impairing the performance of the receiver.

The receiver embodiment of FIG. 5 utilizes the detection algorithm (subtract, add) in which the operation of subtraction and addition pertains to the processing or timing of "clock" pulses within the periods of the composite wave measured between its zero-crossings or other preselected locations in the composite wave. These periods can comprise the previously mentioned minimum recognizable pattern of variations in intervals in the composite wave of "Increased" (Long) or "Decreased" (Short) with respect to the "Unchanged" (Normal) interval in the composite wave or any combination of "Increased", "Decreased" and "Unchanged". The detection algorithm of (subtract, add) can be considered as a couplet comprising a subtractive phase and an additive phase. This particular detection algorithm is suitable for use with the FIG. 1 preferred modulating signal waveform as well as with the alternative preferred modulating signal waves depicted in FIGS. 2A and 2B.

The FIG. 2A modulating signal wave comprises the combination of: (i) a continuous wave having a period equal to twice the period of the power line or carrier wave and such that the amplitude of the continuous wave is equal in magnitude, but opposite in sign, at intervals displaced by one period of the power line wave; and (ii) a periodic wave having a period equal to the period of the power line wave. The FIG. 2A wave also can be obtained by periodically adding a signal derived from the power line wave to the power line. This method is represented in the system block diagram of FIG. 3 by inputs from the power line phases to the waveform source 24 shown collectively by line 66.

The FIG. 2B modulating signal wave can be described as two forms (of opposite polarity) of full cycle and skip waveforms. This arrangement provides one means for transmitting binary and/or ternary information.

Given the preferred signal waves of FIGS. 1, 2A and 2B, the operation of the receiver embodiment depicted in FIG. 5 is relatively straightforward. The zero-crossings (or other preselected locations) in the composite wave on power line 12', 14' or 16' are detected by a zero-crossing detector (or level detector) 68. For power line applications, the detection preferably should be made in the vicinity of the zero-crossings where the instantaneous power is relatively low and where the preferred modulating signal wave exerts a significant influence on the unmodulated 60 Hz power line wave.

The detected zero-crossings are inputted to a totalizer control 70 which includes a two-bit counter. Timing pulses from a timing pulse source 72 are also inputted to the totalizer control. The subtractive and additive phases of the detection algorithm are represented by the states of the second bit of the totalizer control two-bit counter. The two-bit counter counts the successive zero-crossings of the composite wave and, depending upon the state of the second bit, the timing pulses from source 72 are directed by the totalizer control to either the subtractive totalizer 74 or the additive totalizer 76. A comparator 78 compares the total, i.e. "counts" in the subtractive and additive totalizers 74 and 76, respectively, and generates an output signal on line 80 which represents the difference in magnitude and sign between the totalizers 74 and 76. An alternative method for directing the timing pulses to the additive and subtractive totalizers is to program the totalizer control in accordance with a predetermined schedule. This technique permits the encoding of messages for selectively addressing the receiver(s) 32 by uniquely controlling the comparator output in accordance with the predetermined schedule.

The output signal on line 80 is applied to an appropriate utilization means 82 which includes a conventional decoder for use thereby. Representative examples of such utilization means include load control devices for connecting and disconnecting domestic loads such as hot water heaters and air conditioners, consumption meter transponders which transmit a meter reading signal in response to the receipt of an interrogation signal, and switching controls for power-factor correcting capacitors and distribution switching equipment.

INJECTION OF MODULATION AT TRANSMISSION AND SUBTRANSMISSION LEVELS

FIG. 3 is illustrative of a scheme whereby the signals sent over multi-phase lines may be sensed by receivers located on the multiplicity of phases. When modulation is introduced as a voltage, it can, in general, be sensed as a superposition on the power line wave at whatever locations such power line wave(s) may appear by virtue of the power line wave which exists at the point where the modulating signal waveform is injected. Accordingly, such voltages can appear between conductors in various configurations such as wye, delta, zig-zag, etc. It is, moreover, important to recognize that when the power line wave(s) with which the modulating signal waveform is combined pass through a succession of transformations between the point where modulation is injected and the point where it is detected, the modulation will pass through the same succession of transformations. Thus, for example, it is possible that the modulation might be injected in a wye-connected system at transmission or generation level and subsequently pass through wye-to-delta and delta-to-wye transformations to be detected in a wye configured distribution system.

It will be appreciated that the modulating signal wave can be injected at transmission, subtransmission or distribution levels and be detected elsewhere in the system. The injected modulating signal wave will travel both towards the source of generation and towards points of energy consumption in the electric system. At the distribution level it travels preferentially towards the load (where detection may occur) with little interference on the transmission or subtransmission systems. Generally the signal travels with very little dispersion or attenuation.

The feasibility of injecting a modulating signal waveform at transmission level and of detecting the modulation at the distribution level permits a signal flow path from a central injection point to a multiplicity of distribution feeders. In this situation a higher bit rate can be utilized so that the more centralized injection of intelligence can serve a larger number of receivers.

Figure 6B:
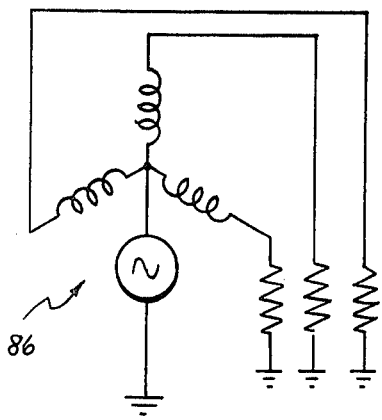
Figure 6A:
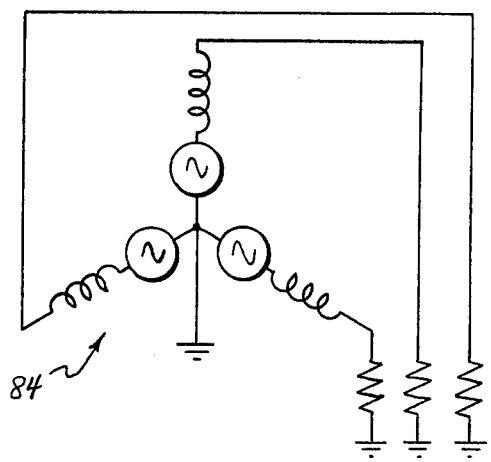

The bit rate can be increased in various ways. For example, separate modulating signal waves can be injected into each of the three phases, as shown in FIG. 6A, thereby achieving a three-fold increase in bit rate. Alternatively or additionally, three modulating signals (one for each phase) of such waveforms can be employed and in such phasing that the addition of the modulating signal waveforms to the corresponding phases of power line voltage results in the peak amplitudes of the composite waves being all equal to the peak amplitudes of the power line waves. In this circumstance large modulating signal waves can be employed without risk of causing modulation of the peak amplitude of the composite waves.

It is clear to those skilled in the art that, analogous to polyphase injection in wye-connected configurations, such as is depicted in FIG. 6A and indicated generally by its reference numeral 84, one can similarly arrange for polyphase injection into delta-connected configurations.

In the case of wye-connected systems having a grounded neutral (which may in some cases be furnished by the earth) or having a fourth wire, there is the option of using a single phase modulating signal wave to superimpose a modulation on all three phases. This modulating signal wave is combined with the power line waves by applying it between the common point of the wye-connection and the grounded neutral or between the common point of the wye-connection and the fourth wire of the system. An example of such injection is depicted in Figure 6B and indicated generally by the reference numeral 86.

A NATIONAL SIGNALLING SCHEME

Since the modulating signal waveform can be injected at transmission or generation levels and can be detected at the distribution levels, a coherent national signalling scheme for transmitting timing (or warning) signals over the interconnected national electric network can be achieved utilizing the method of the present invention. In this case, the modulating signals are injected at relatively few points in the national network and then spread throughout the network to all parts of the interconnected system.

In this situation, the ratio of the modulating signal amplitude to the power line wave amplitude will become diluted by the mixing of modulating signals with the unmodulated power line waves from power generators located at sites remote from the sites of signal injection. Accordingly, for such application, the injection of three phases of modulating signal at relatively large signal level is desirable. Such modulating signals should preferably be of such waveform, and be introduced in such phasing relative to that of the corresponding power line waves, that the peak amplitudes of the composite waves are all the same as or depart minimally from those of the power line waves.

Such a modulation can, for example, be achieved by employing a three-phase signal having a waveform which corresponds to the combination of a 45 Hz wave and a 75 Hz wave of equal amplitudes. This waveform can be generated in a two pole generator by applying a 15 Hz modulation to the direct current magnetizing rotor field of the generator rotating at 3600 rpm. In this instance, a multiplicative process is employed to combine the signal wave with the carrier wave.

It should be noted that by combining a plurality of sinusoidal waves, the periods of which are commensurate with that of the power line wave (in the above case 45 Hz and 75 Hz relative to 60 Hz), it is possible to produce a modulating signal wave which has (as is desirable) zero amplitude at intervals corresponding to the half period of the power line wave. This modulating signal of preferred waveform can be generated by means of rotating machinery driven in phase-coherent synchronism from the power line.

VARIOUS MODULATING SIGNALS

It should be noted that the detection algorithm is, in general, different in the case of modulating signal waveforms of differing periods. Accordingly, it will be appreciated that a suitable receiver can be employed to detect the presence of a modulating signal of one period while ignoring modulating signals of differing periodicity, or, using common receiver elements, sense modulating signals of different periods and distinguish among these. This permits the use of a modulating signal of one period for a national signalling scheme and a modulating signal of a different period for signalling within a utility system.

It should be observed that a large number of possible waveforms are useful when three phases of modulating signal are employed. Among the preferred waveforms that can be conveniently generated and phases to yield composite waves having peak amplitudes that are the same as or depart minimally from those of the power line waves, are those that can be generated by multiplexing half-sinusoids of the power line wave in accordance with an established pattern.

It also should be noted that the acceptable modulating signal waveforms are not restricted to those derivable from half-sinusoids of the power line frequency. The requirement is rather that the period of the modulating signal be commensurate with that of the power line wave in order to produce the recognizable pattern of variations in intervals in the composite wave. There is considerable freedom in selecting a modulating signal waveform. For example, patterns comprising square waves, trapezoids, triangles and the like can be employed (as is implicit in their representation in terms of Fourier expansions).

NON-POWER LINE APPLICATIONS

While the above description pertains principally to power line applications, it should be appreciated that the invention is in no way limited to such application.

By way of illustration only, it should be noted that digital information can be transmitted over pre-existing carrier waves (in the conventional sense) without impairing the pre-existing function of the carrier waves. For instance, digital information corresponding to newspaper text can be transmitted via an amplitude modulated radio signal without deleteriously affecting the normal AM information.

Having described in detail a preferred embodiment of our invention, it will now be apparent to those skilled in the art that numerous modifications can be made therein without departing from the scope of the invention as defined in the appended claims.

What we claim and desire to secure by Letters Patent of the United States is:

1. A method of transmitting digital intelligence over a power line having a pre-existing alternating wave thereon, said method comprising the steps of:
   1. combining a signal wave with said pre-existing alternating wave on the power line to produce a composite wave having a recognizable pattern of variations in the durations of the intervals defined by preselected locations in the composite wave, said pattern of variations in the durations of the intervals representing at least a portion of the digital intelligence to be transmitted; and,
   2. extracting from the composite wave the digital intelligence represented by the pattern of variations in interval durations therein.

2. The method of claim 1 wherein the digital intelligence is extracted from the composite wave by:
   1. detecting said variations in the durations of the intervals defined by the preselected locations in the composite wave; and,
   2. converting the detected variations in the durations in the intervals into a signal having a characteristic which is a function of the recognizable pattern of variations in interval durations.

3. The method of claim 1 wherein said signal wave is combined with said pre-existing alternating wave on the power line by adding the signal wave to the pre-existing alternating wave.

4. The method of claim 1 wherein said signal wave is combined with said pre-existing alternating wave on the power line by subtracting the signal wave from the pre-existing alternating wave.

5. The method of claim 1, wherein said signal wave is combined with said pre-existing alternating wave on the power line by multiplying together the signal wave and the pre-existing alternating wave.

6. The method of claim 1 including the step of selecting said preselected locations in the composite wave with respect to the zerocrossings of the composite wave.

7. The method of claim 1 including the step of producing said signal wave as a waveform which is representable as a Fourier series of at least one term with a fundamental frequency which is some rational fraction, either proper or improper, of the fundamental frequency of the power line.

8. The method of claim 1 including the step of producing said signal wave as a waveform which is representable as a Fourier series of more than one term with a fundamental frequency which is the same as the power line frequency.

9. The method of claim 1 including the step of producing said signal wave as a waveform which is representable as a Fourier series of at least one term with a fundamental frequency which is a rational, noninteger fraction, either proper or improper, of the power line frequency.

10. The method of claim 1 including the step of producing said signal wave as a waveform which comprises the combination of: (i) a wave having a period equal to twice the period of the pre-existing alternating wave on the power line and such that the amplitude of said wave is equal in magnitude, but opposite in sign, at intervals displaced by one period of the pre-existing alternating wave on the power line; and, (ii) a periodic wave having a period equal to the period of said pre-existing alternating wave on the power line.

11. The method of claim 10 including the step of producing said signal wave such that it comprises sinusoidal segments.

12. The method of claim 1 including the step of producing said signal wave as a waveform having a period equal to twice the period of said pre-existing alternating wave on the power line and comprising a full sinusoid of finite amplitude, but opposite in sign with respect to a full sinusoid of said pre-existing alternating wave, and having a duration equal to one period of said pre-existing alternating wave on the power line and elsewhere is of zero amplitude.

13. The method of claim 1 including the step of producing said signal wave as a waveform having a period equal to the period of said pre-existing alternating wave on the power line and comprising at least a segment of a sinusoid.

14. The method of claim 13 including the step of producing said segment of a sinusoid having a duration equal to the duration of a half cycle of said pre-existing alternating wave on the power line.

15. The method of claim 1 including the step of producing said signal wave as a waveform having zero amplitude at intervals corresponding to the half periods of said pre-existing alternating wave on the power line.

16. The method of claim 1 including the step of producing said signal wave as a waveform which is equivalent to the waveform which can be produced by the combination of a plurality of sinusoidal waves of periodicities commensurate with the period of said pre-existing alternating wave on the power line.

17. The method of claim 1 wherein the step of combining said signal wave and said pre-existing alternating wave on the power line includes combining said waves in a phase relationship which produces the maximum departure from the interval pattern which characterizes said pre-existing alternating wave on the power line.

18. The method of claim 1 wherein the step of combining said signal wave and said pre-existing alternating wave on the power line includes combining said waves in a phase relationship with the extrema of said signal wave occurring at the zero-crossings of said pre-existing alternating wave on the power line.

19. The method of claim 1 wherein the step of combining said signal wave and the pre-existing alternating voltage wave on the power line includes combining said waves in a phase relationship which produces a composite voltage wave having minimum variations in its peak amplitudes.

20. The method of claim 1 wherein the step of combining said signal wave and the pre-existing alternating voltage wave on the power line includes combining said waves in a phase relationship which produces a composite voltage wave having peak amplitudes which depart minimally from the peak amplitudes of said pre-existing alternating voltage wave on the power line.

21. The method of claim 1 wherein the step of combining said signal wave and the pre-existing alternating voltage wave on the power line includes combining said waves in a phase relationship which produces a composite voltage wave in which amplitude modulation of said composite voltage wave at its extrema is minimized.

22. The method of claim 1 wherein the step of combining said signal wave and the pre-existing alternating voltage wave on the power line includes combining said waves in a phase relationship with the zero levels of said signal wave occurring at the extrema of said pre-existing alternating voltage wave which produces a composite voltage wave in which amplitude modulation of said composite voltage wave at its extrema is minimized.

23. A method of transmitting digital intelligence over a power line having a pre-existing alternating wave thereon, said method comprising the steps of:
1. combining a signal wave with said pre-existing alternating wave on the power line to produce a composite wave having a recognizable pattern of variations in the durations of the intervals defined by preselected locations in the composite wave, said pattern of variations in the durations of the intervals representing at least a portion of the digital intelligence to be transmitted and wherein said pattern of variations departs maximally from the corresponding intervals which characterize the pre-existing alternating wave on the power line; and
2. extracting from the composite wave the digital intelligence represented by the pattern of variations in interval durations therein.

24. A method of transmitting digital intelligence over a power line having a pre-existing alternating wave thereon, said method comprising the steps of:
1. combining a signal wave with said pre-existing alternating wave on the power line to produce a composite wave having a recognizable pattern of variations in the durations of the intervals defined by preselected locations in the composite wave, said pattern of variations in the durations of the intervals representing at least a portion of the digital intelligence to be transmitted and wherein said pattern of variations departs from the means of the intervals of said pre-existing alternating wave on the power line averaged over the period of said composite wave in accordance with a pattern which includes at least an increased interval and a decreased interval; and 2. extracting from the composite wave the digital intelligence represented by the pattern of variations in interval durations therein.

25. The method of claim 24 including the step of producing said pattern to also include at least one unchanged interval.

26. A method of transmitting digital intelligence over a power line having a pre-existing alternating wave thereon, said method comprising the steps of:

1. combining a signal wave with said pre-existing alternating wave on the power line to produce a composite wave having a recognizable pattern of variations in the durations of the intervals defined by preselected locations in the composite wave, said pattern of variations in the durations of the intervals representing at least a portion of the digital intelligence to be transmitted and wherein said pattern of variations departs from the running mean of the intervals of said pre-existing alternating wave on the power line in accordance with a pattern which includes at least an increased interval and a decreased interval; and 2. extracting from the composite wave the digital intelligence represented by the pattern of variations in interval durations therein.

27. The method of claim 26 including the step of producing said pattern to also include at least one unchanged interval.

28. The method of claim 1 wherein the intelligence is extracted from the composite wave by:

1. detecting the variations in the durations of the intervals defined by the preselected locations in the composite wave; and,
2. comparing the duration of each interval with the duration of a predetermined prior interval.

29. The method of claim 23 including the step of determining the duration of each interval by counting timing pulses between predetermined detected preselected locations in the composite wave.

30. The method of claim 2 including the step of generating said signal having a characteristic which is a function of the recognizable pattern of variations in interval durations by accumulating timing pulses in a positive and negative sense in order to produce a cumulative difference in sign and magnitude resulting from a prescribed counting pattern over predetermined intervals defined by a plurality of said preselected locations in the composite wave.

31. A method for transmitting digital intelligence over power lines having polyphase, pre-existing alternating waves thereon, said method comprising the steps of:

1. combining a signal wave at least one phase of said pre-existing alternating waves on the power lines to produce at least one composite wave having a recognizable pattern of variations in the durations of the intervals defined by preselected locations in the composite wave, said pattern of variations in the durations of the intervals representing at least a portion of the digital intelligence to be transmitted; and,
2. extracting from said at least one composite wave the digital intelligence represented by the pattern of variations in interval durations therein.

32. The method of claim 31 wherein said digital intelligence is extracted by:

1. detecting the variations in the durations of the intervals defined by the preselected locations in said at least one composite wave; and,
2. converting the detected variations in the durations of the intervals into a signal having a characteristic which is a function of the recognizable pattern of variations in interval durations.

33. The method of claim 31 wherein the step of combining said signal wave and at least one phase of said pre-existing alternating waves on the power lines includes combining said waves in a phase relationship which produces the maximum departure from the interval pattern which characterizes said at least one phase of said pre-existing alternating waves on the power lines.

34. The method of claim 31 wherein the signal wave is combined with the alternating voltage wave of said at least one phase of the pre-existing alternating waves on the power lines and includes combining said waves in a phase relationship which produces a composite voltage wave having peak amplitudes which depart minimally from the peak amplitudes of said alternating voltage wave.

35. The method of claim 31 wherein the signal wave is combined with the alternating voltage wave of said at least one phase of the pre-existing alternating waves on the power lines and includes combining said waves in a phase relationship which produces a composite voltage wave in which amplitude modulation of said composite voltage wave at its extrema is minimized.

36. The method of claim 31 wherein the signal wave is combined with the alternating voltage wave of said at least one phase of the pre-existing alternating waves on the power lines and includes combining said waves in a phase relationship with the extrema of said signal wave occurring at the zero-levels of said alternating voltage wave.

37. The method of claim 31 wherein said signal wave is combined with the alternating voltage wave of said at least one phase of the pre-existing alternating waves on the power lines and includes combining said waves in a phase relationship which produces a composite voltage wave in which variations in its peak amplitudes is minimized.

38. The method of claim 31 wherein said signal wave is combined with the alternating voltage wave of said at least one phase of the pre-existing alternating waves on the power lines and includes combining said waves in a phase relationship with the zero-levels of the signal wave occurring at the extrema of said alternating voltage wave which produces a composite voltage wave whereby amplitude modulation of said composite voltage wave at its extrema is minimized.

39. The method of claim 31 wherein a single phase signal wave is combined with a plurality of phases of said pre-existing alternating waves on the power lines and includes combining said waves to produce a plurality of composite waves each having a recognizable pattern of variations in the durations of the intervals defined by preselected locations in each composite wave, said pattern of variations in the durations of the intervals representing at least a portion of the intelligence to be transmitted.

40. The method of claim 39 wherein said single phase signal wave is combined with said plurality of phases of said pre-existing alternating waves on the power lines by applying said single phase signal wave between the common point of a Y-connected power line system and ground.

41. The method of claim 39 wherein said single phase signal wave is combined with said plurality of phases of said pre-existing alternating waves on the power lines by applying said single phase signal wave between the common point of a Y-connected power line transformer and ground.

42. The method of claim 39 wherein said single phase signal wave is combined with said plurality of phases of said pre-existing alternating waves on the power lines by applying said single phase signal wave between the common point of a Y-connected power line transformer and ground.

43. A method for transmitting digital intelligence over power lines having polyphase, pre-existing alternating waves thereon, said method including the steps of:
1. combining each of a plurality of separate signal waves representing different intelligence with each phase of said pre-existing alternating waves on the power lines to produce a plurality of composite waves each having a recognizable pattern of variations in the durations of the intervals defined by preselected locations in each of said plurality of composite waves, each pattern of variations in the durations of the intervals of each composite wave representing at least a portion of the digital intelligence to be transmitted; and,
2. extracting from each of said plurality of composite waves the digital intelligence represented by the pattern of variations in interval durations therein.

44. A method for transmitting digital intelligence over power lines having polyphase, pre-existing alternating waves thereon, said method including the steps of:
1. combining a signal wave comprising a plurality of phases wherein each of said plurality of phases is combined with the corresponding phases of said pre-existing alternating waves on the power lines to produce a corresponding plurality of composite waves each having a recognizable pattern of variations in the durations of the intervals defined by preselected locations in each of said plurality of composite waves, each pattern of variations in the durations of the intervals of each composite wave representing at least a portion of the digital intelligence to be transmitted; and,
2. extracting from each of said plurality of composite waves the digital intelligence represented by the patterns of variations in interval durations therein.

45. The method of claim 44 wherein each phase of said signal wave comprising a plurality of phases is combined with respect to the corresponding phase of said pre-existing alternating waves on the power lines and includes combining said waves in a phase relationship to produce a plurality of composite waves wherein each of said composite waves has peak amplitudes which depart minimally from the peak amplitudes of the corresponding phase of said pre-existing alternating waves on the power lines.

46. Apparatus for transmitting digital intelligence over a power line having a pre-existing alternating wave thereon, said apparatus comprising:
1. means for combining a signal wave with said pre-existing alternating wave on a power line to produce a composite wave having a recognizable pattern of variations in the durations of the intervals defined by preselected locations in said composite wave, said pattern of variations in the durations of the intervals representing at least a portion of the digital intelligence to be transmitted, and,
2. means for extracting from said composite wave the digital intelligence represented by the pattern of variations in interval durations therein.

47. The apparatus of claim 46 wherein the means for extracting digital intelligence from the composite wave comprises:
1. means for detecting the variations in the durations of the intervals defined by the preselected locations in said composite wave; and,
2. means for converting the detected variations in the durations of the intervals into a signal having a characteristic which is a function of the said recognizable pattern of variations in interval durations therein.

48. The apparatus of claim 46 wherein the combining means adds the signal wave to the pre-existing alternating wave on a power line.

49. The apparatus of claim 46 wherein the combining means subtracts the signal wave from the pre-existing alternating wave on a power line.

50. The apparatus of claim 46 wherein the combining means multiplies together the signal wave and the pre-existing alternating wave on a power line.

51. The apparatus of claim 46 wherein said signal wave is representable as a Fourier series of at least one term with a fundamental frequency which is some rational fraction, either proper or improper, of the fundamental frequency of the power line frequency.

52. The apparatus of claim 46 wherein said signal wave is representable as a Fourier series of more than one term with a fundamental frequency which is the same as the power line frequency.

53. The apparatus of claim 46 wherein said signal wave is representable as a Fourier series of at least one term with a fundamental frequency which is a rational, noninteger fraction either proper or improper, of the power line frequency.

54. The apparatus of claim 46 wherein the combining means alternately combines a large amplitude sinusoid and a small or zero amplitude sinusoid of the pre-existing alternating wave frequency with said pre-existing alternating wave on a power line.

55. The apparatus of claim 46 wherein said signal wave and the pre-existing alternating voltage wave on a power line are combined by the combining means in a phase relationship with the extrema of said signal wave occurring at the zero-crossings of said pre-existing alternating voltage wave on a power line.

56. The apparatus of claim 46 wherein said signal wave and the pre-existing alternating voltage wave on a power line are combined by the combining means in such a phase relationship to produce a composite voltage wave which has peak amplitudes which depart minimally from the peak amplitudes of said pre-existing alternating voltage wave on a power line.

57. The apparatus of claim 47 wherein said means for converting the detected variations in the durations of the intervals into a signal having a characteristic which is a function of the said recognizable pattern of variations in interval durations therein includes means for generating timing pulses and further includes accumulating means for accumulating said timing pulses in a positive and negative sense in order to produce a cumulative difference in sign and magnitude resulting from a prescribed accumulation pattern over predetermined periods defined by a plurality of said preselected locations in said composite wave.

58. A method for modulating a pre-existing alternating voltage wave on a power line, said method comprising the steps of:
 1. generating a signal wave; and,
 2. combining said signal wave and said pre-existing alternating voltage wave on a power line together in a phase relationship which produces a composite voltage wave having peak amplitudes which depart minimally from the peak amplitudes of said pre-existing alternating voltage wave, said composite voltage wave having a recognizable pattern of variations in the durations of the intervals defined by preselected locations in said composite voltage wave with said pattern of variations representing digital intelligence which is modulated on said pre-existing alternating voltage wave on a power line.

59. A method of modulating a pre-existing alternating voltage wave on a power line, said method comprising the steps of:
 1. generating a signal wave; and,
 2. combining said signal wave and said pre-existing alternating voltage wave on a power line together in a phase relationship which produces a composite voltage wave in which amplitude modulation of said composite voltage wave at its extrema is minimized, said composite voltage wave having a recognizable pattern of variations in the durations of the intervals defined by preselected locations in said composite voltage wave with said pattern of variations representing digital intelligence which is modulated on said pre-existing alternating voltage wave on a power line.

60. A method for modulating a pre-existing alternating voltage wave on a power line, said method comprising the steps of:
 1. generating at least first and second signal waves; and,
 2. combining said at least first and second signal waves and said pre-existing alternating voltage wave on a power line together in a phase relationship which produces a composite voltage wave having peak amplitudes which depart minimally from the peak amplitudes of said pre-existing alternating voltage wave, said composite voltage wave having a recognizable pattern of variations in the durations of the intervals defined by preselected locations in said composite voltage wave with said pattern of variations representing digital intelligence which is modulated on said pre-existing alternating voltage wave on a power line.

61. A method for modulating a pre-existing alternating voltage wave on a power line, said method comprising the steps of:
 1. generating at least first and second signal waves; and,
 2. combining said at least first and second signal waves and said pre-existing alternating voltage wave on a power line together in a phase relationship which produces a composite voltage wave in which amplitude modulation of said composite voltage wave at its extrema is minimized, said composite voltage wave having a recognizable pattern of variations in the durations of the intervals defined by preselected locations in said composite voltage wave with said pattern of variations representing digital intelligence which is modulated on said pre-existing alternating voltage wave on a power line.

62. A method for extracting digital intelligence from a composite wave on a power line, said composite wave having a recognizable pattern of variations in the durations of the intervals defined by preselected locations in said composite wave with said pattern of variations in the durations of the intervals resulting from combining a signal wave with a pre-existing alternating wave on a power line and representing digital intelligence, said method comprising the steps of:
 1. detecting said recognizable pattern of variations in the durations of the intervals defined by the preselected locations in the composite wave; and,
 2. converting the detected variations in the durations of the intervals into a signal having a characteristic which is a function of the recognizable pattern of variations in interval durations therein.

63. The method of claim 44 further including the steps of:
 1. generating said signal wave comprising a plurality of phases by applying a 15 Hz. waveform to the direct current magnetizing rotor field of a two pole generator rotating at a speed of 3600 revolutions per minute, said signal wave comprising a plurality of phases having a waveform which corresponds to the combination of a 45 Hz. wave and a 75 Hz. wave of equal amplitudes; and
 2. combining said signal wave comprising a plurality of phases wherein each of said plurality of phases is combined with the corresponding phases of said pre-existing alternating waves on the power lines by multiplying together each of said plurality of phases of said signal wave and the said corresponding phases of said pre-existing alternating waves on the power lines.

64. The method of claim 1 including the step of producing said signal wave as a waveform which comprises successive full sinusoidal cycles of a 60 Hz. wave with a phase reversal of a full cycle occurring in alternate full cycles.

65. The method of claim 1 including the step of producing said signal wave as a waveform having a period equal to four periods of said pre-existing alternating wave on the power line, and comprising two full sinusoids of finite amplitude, each having a duration equal to one period of said pre-existing alternating wave, one of said full sinusoids being equal in sign with respect to said pre-existing alternating wave and occurring in a first period of said waveform, and the other of said full sinusoids being opposite in sign with respect to said pre-existing alternating wave and occurring in a third period of said waveform, and elsewhere said waveform is of zero amplitude.

66. The method of claim 1 including the step of selecting said preselected locations in the composite wave at an amplitude which differs from the zero-crossings of said composite wave.

67. The apparatus of claim 47 further comprising utilization means responsive to said signal having a characteristic which is a function of the said recognizable pattern of variations in interval durations therein.

68. The apparatus of claim 67 wherein said utilization means comprises means for selectively connecting and disconnecting domestic loads to and from a power line.

69. The apparatus of claim 68 wherein said domestic loads comprise hot water heaters.

70. The apparatus of claim 68 wherein said domestic loads comprise air conditioners.

71. The apparatus of claim 67 wherein said utilization means comprises consumption meter transponders.

72. The apparatus of claim 67 wherein said utilization means comprises switching controls for connecting and disconnecting power-factor correcting capacitors to and from a power line.

73. The apparatus of claim 67 wherein said utilization means comprises switching controls for distribution switching equipment.

* * * * *

UNITED STATES PATENT AND TRADEMARK OFFICE
CERTIFICATE OF CORRECTION

PATENT NO. : 4,106,007
DATED : August 8, 1978
INVENTOR(S) : Reed H. Johnston, Dennis C. Jeffreys, and Lawrence J. Stratton It is certified that error appears in the above-identified patent and that said Letters Patent are hereby corrected as shown below:

IN THE ABSTRACT:

Line 10, "composite" should be "carrier"
Line 11, "carrier" should be "composite"

Col. 2, line 23, "c.F." should be "C.F."
Col. 5, line 15, between "combined" & "block", omit "a"

IN THE CLAIMS:

Col. 23, line 8, after "line" insert --system and the fourth wire thereof--; delete "transformer and ground"

Signed and Sealed this

Twenty-fourth Day of April 1979

[SEAL]

Attest:

RUTH C. MASON
Attesting Officer

DONALD W. BANNER
Commissioner of Patents and Trademarks